Feb. 7, 1967 D. R. KURTZ ETAL 3,302,990
METHOD AND APPARATUS FOR EVACUATING AN ELECTRIC
DISCHARGE DEVICE OF THE VACUUM TYPE
Filed March 11, 1965

INVENTORS:
DONALD R. KURTZ,
DEMOCRITOS J. VERAS,
BY William Freedman
ATTORNEY

United States Patent Office 3,302,990
Patented Feb. 7, 1967

3,302,990
METHOD AND APPARATUS FOR EVACUATING AN ELECTRIC DISCHARGE DEVICE OF THE VACUUM TYPE
Donald R. Kurtz, Malvern, Pa., and Democritos James Veras, Stony Brook, N.Y., assignors to General Electric Company, a corporation of New York
Filed Mar. 11, 1965, Ser. No. 438,868
9 Claims. (Cl. 316—25)

This invention relates to a method and apparatus for evacuating a vacuum device, particularly an electric discharge device of the vacuum type.

The invention is particularly, though not exclusively, concerned with the pumpless method of evacuation disclosed and claimed in U.S. Patent No. 2,934,392-DeSantis et al., assigned to the assignee of the present invention. That process utilizes a getter material of a type that is reversibly reactive with hydrogen and is capable of sorbing large quantities of hydrogen at reduced temperatures. Examples of such getter materials are metals such as titanium and zirconium and hydrides thereof. In referring to such metals as being reversibly reactive with hydrogen, it is meant that such metals will sorb substantial quantities of hydrogen at relatively low temperatures and will desorb or release the sorbed hydrogen when its temperature is increased.

This getter material is placed in the envelope that is to be evacuated; and the envelope, while still open, is heated to a predetermined elevated temperature. Thereafter, the envelope is cooled and the hydrogen in the envelope is sorbed by the getter to reduce the pressure in the envelope to values of $10^{-5}$ mm. of mercury or lower, at normal operating temperatures.

A problem presented by this method of evacuation is that the temperature to which the envelope and getter are heated has had to be very high (e.g., above about 700° C. in the case of the preferred titanium or titanium hydride getter). Perhaps the most important reason that it was necessary to raise the temperature to this high level was to reduce the hydrogen concentration in the getter material to a very low level so as to render the getter material capable of sorbing the necessary large quantities of hydrogen when its temperature was reduced. The high temperatures required by this process, as previously practiced, have limited its use to envelopes made of materials capable of withstanding the high temperatures. But certain vacuum devices have envelopes of glass or other materials that can not withstand these high temperatures.

An object of our invention is to render this general method of evacuation usable in the evacuation of envelopes that cannot withstand the high temperatures previously employed.

In practicing our invention, we prefer to use for the getter material a metal hydride instead of the elemental metal. The metal hydride is typically a granular or powdery substance that must be effectively confined if loose particles thereof are not to find their way into regions where they could interfere with operation of the discharge device. This presents a problem because the confining means must also afford communication between the getter material and the interior of the envelope if the getter material is to be capable of sorbing the gaseous content of the envelope.

Thus, another object of our invention is to provide improved confining means for a metal hydride which affords the required communication between the hydride and the space under evacuation.

In carrying out our invention in one form, we provide a small metal capsule that has two internal compartments separated by a partition of porous metal. In a first one of the compartments, we place a getter material in the form of a hydride of a metal that is reversibly reactive with hydrogen and is capable of sorbing a large quantity of hydrogen at low temperatures. Thereafter, we heat the capsule and the getter material to a sufficiently high temperature to reduce the hydride to said metal and hydrogen and to remove gases and gas-forming contaminants from the surfaces inside the capsule. We vent the gases evolved by such heating to the exterior of the capsule, and thereafter we seal the interior of the capsule from its exterior. We then place the sealed capsule in the envelope that is to be evacuated. The envelope is then baked out and its gaseous contents displaced by hydrogen, after which it is sealed with a quantity of hydrogen trapped therein. Thereafter, an external wall of the second compartment of the capsule is punctured to establish communication between the getter material and the interior of the envelope via the porous partition. When this communication is established, the getter material sorbs the hydrogen in the envelope, thus reducing the pressure therein to the desired low level.

The pores of the porous metal partition are sufficiently small to prevent any particles of the getter material from escaping from the capsule but are large enough to permit hydrogen to pass freely therethrough so that it can reach the getter material and react with it.

For a better understanding of our invention, reference may be had to the following description taken in conjunction with the accompanying drawings, wherein.

Figure 1:
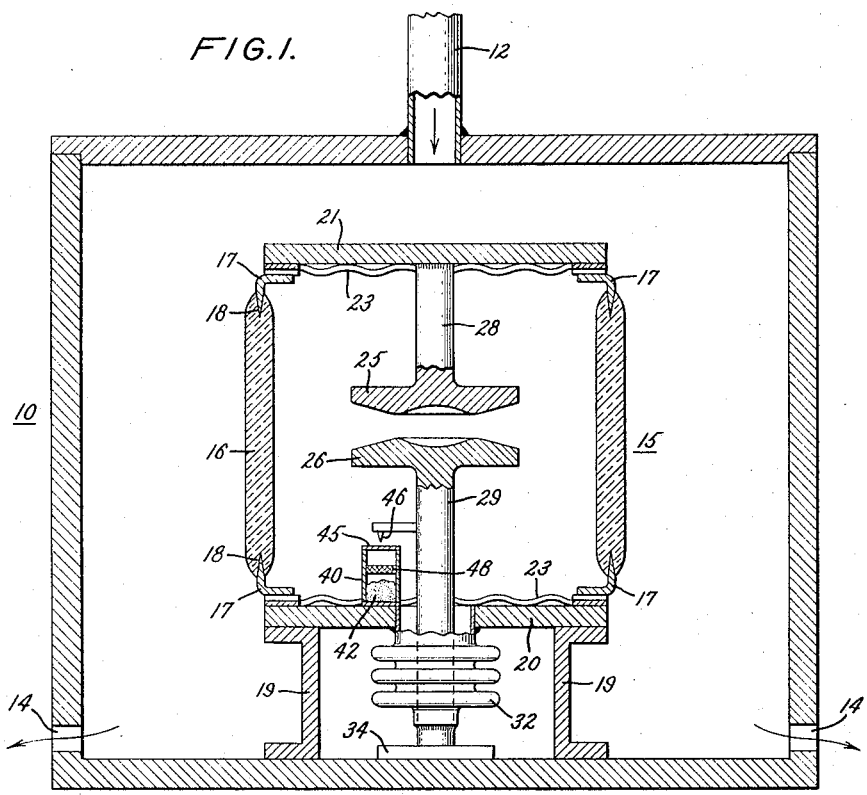
FIG. 1 is a schematic illustration showing both a device constructed in accordance with an embodiment of our invention and processing equipment that may be utilized in carrying out the method of our invention.

Referring now to FIG. 1, there is shown a furnace generally designated 10 of a type in which the method of the present invention may be advantageously carried out. The temperature inside the furnace may be appropriately controlled by suitable means (not shown). A gas inlet 12 is provided in the top of the furnace and gas outlets 14 at the bottom. Except for the inlet 12 and the outlets 14, the furnace is closed during operation.

A partially assembled electric discharge device, in the form of a vacuum type circuit interrupter, is shown disposed within the furnace 10. This vacuum type circuit interrupter comprises an envelope 15 comprising a cylindrical member 16 of glass having a pair of annular flanges 17 at its opposite ends joined thereto by suitable glass-to-metal seals 18. Disposed at the outer sides of each of the flanges 17 are end plates 20 and 21. In FIG. 1, the lower end plate 20 is shown resting on a set of spaced-apart tracks 19 secured to the floor of the furnace 10.

Between each of the flanges 17 and its adjacent end plate 20 or 21 is a corrugated washer 23 of a suitable brazing material. These washers are adapted to melt when the temperature inside the furnace 10 is raised to a predetermined level; and when this melting occurs, the metal of each washer forms a joint between the flange 17 and the adjacent end plate 20 or 21. The corrugations in each washer, of course, disappear when the washer melts, and a high quality vacuum-tight joint is formed after melting occurs.

The corrugations in each washer extend in a radial direction with respect to the cylindrical member 16. Thus, until the washers melt, there are provided between the corrugations relatively large radially-extending passages that afford free communication between the interior and exterior of the envelope 15. This communication serves as an important purpose during fabrication, as will soon be explained.

The vacuum circuit interrupter further comprises a pair of separable contacts 25 and 26 located within the envelope 15. The upper contact 25 is supported on a conductive rod 28 that is suitably brazed to contact 25 at its lower end and is suitably brazed to the upper end plate 21 at its upper end. The lower contact 26 is supported on a conductive rod 29 that is suitably brazed at its upper end to the lower contact. This rod 29, which serves as an operating rod for the movable lower contact, extends freely through an opening 30 in the lower end cap 20. A flexible metallic bellows 32 surrounds the rod 29 and is joined in sealed relationship at its respective opposite ends to the end cap 20 and the rod 29. In the assembled device, this bellows permits the operating rod 29 to be operated in a vertical direction for moving the lower contact 26 into and out of engagement with the upper contact 25. While the vacuum device is being fabricated in the furnace 10, downward movement of the rod 29 past the position shown in FIG. 1 is blocked by means of a suitable stop 34 fixed to the furnace.

Figure 2:
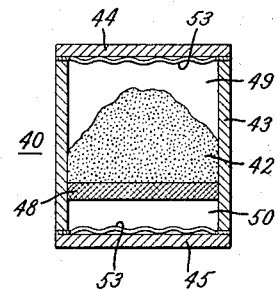
FIG. 2 is a cross-sectional view of a gettering capsule that is used in practising the method of the present invention.

Also located within the envelop 15 is a small capsule 40 that contains a getter material that, in a manner soon to be described, is used in evacuating the envelope 15. The getter material is preferably titanium that has been reduced from titanium hydride, as will soon be described. A detailed cross-sectional view of the capsule 40 containing the getter material is shown in FIG. 2. In FIG. 2, the capsule 40 is in a position inverted from its position of FIG. 1. This capsule 40 is suitably attached to the lower end cap 20 and is in a completely sealed condition during the initial stages of the processing operation.

After the partially assembled vacuum interrupter is placed in the furnace 10, the furnace is continuously supplied with dry hydrogen and the excess furnace atmosphere is permitted to escape through the outlets 14 in the furnace. The supply of hydrogen and the escape thereof is such that the atmosphere of the furnace is continuously being replenished by dry hydrogen, and any other gases in the furnace are flushed out through outlet 14. Additionally, in the furnace the hydrogen is heated and thereby expanded or rarified.

When the temperature inside the furnace is increased through a predetermined temperature range, the heated parts of the vacuum interrupter release their adsorbed gases and the surface contaminants decompose into gases.

The passages afforded by the washers 23 enable the dry hydrogen atmosphere of the furnace to enter the envelope and mix with these gases as well as with the normal gaseous contents of the device. Due to the above-described continuous replenishment of the dry hydrogen atmosphere of the furnace and flushing afforded thereby, the mixing of the gaseous contents of the envelope and furnace atmosphere results in such gaseous contents being flushed out and displaced by an essentially pure hydrogen atmosphere corresponding to the expanded or rarified atmosphere of the furnace. At a predetermined elevated temperature, the brazing washers 23 melt, thus sealing the envelope 15 and entrapping in the envelope a residual quantity of the expanded essentially pure hydrogen atmosphere.

The device is then permitted to cool, thus solidifying the seals formed by the brazing washers 23. Up until this point, the small capsule 40 had been sealed and no communication was possible between its interior and exterior; but at this point, the capsule 40 is punctured and a passageway is provided between the titanium getter material 42 in the capsule and the hydrogen atmosphere in the envelope 15. When this occurs, the titanium voraciously sorbs or otherwise reacts with the hydrogen in the envelope 15, and thus the envelope is evacuated to the desired high degree (i.e., $10^{-5}$ mm. of mercury or lower).

The capsule 40, which contains the getter material 42, is preferably made of thin sheets of stainless steel. It comprises a cylindrical portion 43 and a pair of end walls 44 and 45 at opposite ends of the cylindrical portion 43. One of the end walls 44 is suitably brazed to the lower end cap 20 of the vacuum interrupter. The other end wall 45 is located in alignment with a punch 46 suitably fixed to the operating rod 29. When the envelope 15 has cooled to the desired extent, the operating rod 29 is driven downwardly sufficiently to force the sharp end of the punch 46 through the end wall 45, after which the rod 29 and punch 46 are returned upwardly to their position of FIG. 1. This motion of punch 46 provides a relatively large opening between the interior of previously sealed capsule 40 and the surrounding space, thus affording access between the getter material 42 and the hydrogen in the surrounding space. When this occurs, the getter material 42 rapidly sorbs the hydrogen inside the envelope and thus evacuates the envelope, as explained above.

It should be noted that the above-described puncturing means 46, 29 provides an exceptionally simple way of opening the capsule 40 at the desired time. By operating the punch 46 through a part (29) that is already present and must anyway be mounted for movement, we can obviate the necessity for introducing additional moving parts or seals about such movable parts. Nor are any special magnetic arrangements or other complexities needed for puncturing the capsule 40.

It is to be understood that the normal opening stroke of the contact 26 does not bring the punch 46 into engagement with end cap 45 of the capsule. An additional downward travel past the limit of the normal opening stroke is relied upon. Thus, when the interrupter is later operated through its normal opening and closing operations, the punch 46 remains spaced from the capsule 40 and out of frictional engagement with any of its parts, thereby precluding any unintentional welding or seizure between these parts.

FIG. 2 is an enlarged cross-sectional view of capsule 40 in an inverted position relative to its position of FIG. 1. It will be apparent from FIG. 2 that the interior of capsule 40 is divided into two compartments 49 and 50 by a partition 48. This partition 48 is made of a porous metal, preferably sintered stainless steel. The pores of the partition 48 are of a relatively small size, e.g., a size that will block the passage therethrough of particles larger than about ten microns in diameter. The partition 48 is suitably brazed about its entire outer periphery to the inner periphery of cylindrical member 43.

The getter material 42 is preferably titanium hydride, which is a granular or powdery substance when introduced into compartment 49. The particles constituting the titanium hydride can be quite small, but they are not small enough to pass through the porous metal partition 48. Thus, the compartment 49 can effectively confine the titanium hydride powder. Gases, on the other hand, particularly hydrogen, have little difficulty in passing through the partition 48. Thus, when the wall 45 of the capsule is punctured, as above-described, the hydrogen gas in the large envelope 15 can readily pass through the partition 48 to react with or be sorbed by the getter material 42. It is to be understood that the above-described puncturing action is terminated before the punch can reach partition 48, and thus the partition 48 is not affected by the punching operation.

Before the capsule 40 is inserted into the vacuum interrupter assembly, its interior is highly evacuated and sealed. In addition, most of the titanium hydride getter material 42 that was originally introduced into the capsule 40 is converted to titanium containing only a small amount of hydrogen in solution therewith. As is generally known, this conversion will greatly increase the capacity of the getter material to sorb or react with additional quantities of hydrogen. This conversion of the getter material is referred to hereinafter as activation of the getter material.

This evacuation of the capsule 40 and conversion of the titanium hydride into titanium containing only a small amount of hydrogen can be accomplished by a process similar to that employed for evacuating the envelope 15. More particularly, corrugated brazing washers 53 are placed between the end caps 44 and 45, and the capsule is heated in a hydrogen furnace such as 10 of FIG. 1. These washers 53 have radially extending corrugations corresponding to the corrugations of the washers 23 in FIG. 1, thus affording free communication between the interior and exterior of capsule 40 until they melt in response to this heating. These particular washers are preferably made of a silver solder that melts at about 778° C. The heating step gradually increases the temperature of the capsule 40 to a value between 778 and 1000° C., where it is maintained for a suitable period. As this temperature range is approached, the titanium hydride 42 is converted to titanium and hydrogen; oxides and other contaminants present in the getter material and on the capsule walls decompose into gases; and adsorbed gases on the capsule walls are released. All of these gases mix with the hydrogen atmosphere of the furnace and are displaced through the large passages provided by the corrugations in the washers. When the temperature enters the 778–1000° C. range, substantially all the hydrogen previously sorbed by the titanium is released and substantially all of the gases on the interior surfaces of the capsule are released and displaced by the hydrogen atmosphere of the furnace. After two or three minutes in this temperature range, the washers 53 melt and collapse, thereby sealing the capsule 40 and entrapping therein an essentially pure hydrogen atmosphere. At this stage of the process, the titanium is in almost its pure elemental state, in which condition it is capable of sorbing large quantities of hydrogen when its temperature is reduced. This will be apparent from the characteristic curve for titanium shown in FIG. 3 of the aforementioned DeSantis et al patent. Thus, when the temperature of the capsule 40 is thereafter reduced, the titanium easily sorbs the small amount of rarified hydrogen sealed therein. Because the internal volume of the capsule is very small and the quantity of titanium is relatively large, the titanium sorbs only a small percentage of its total capacity, and a large residual capacity remains for further sorption of hydrogen. This residual capacity is later relied upon to sorb the hydrogen in the envelope 15 of the vacuum interrupter when the capsule 40 is punctured, as was described hereinabove.

Prior evacuation processes which have used getter metals or their hydrides in the general manner set forth hereinabove have been limited in their application to envelopes which could withstand very high temperatures. Typically, in these prior processes, the getter material is continuously exposed to the internal atmosphere of the envelope, and it has been necessary to heat the entire envelope to a high temperature in order to reduce the hydrogen concentration of the getter material to the required low level so as to render it capable of sorbing the necessary amount of hydrogen. For titanium or titanium hydride getter materials, the minimum temperature has been about 700° C. But this is above the melting temperature of the usual glass that is used for envelope 15 of FIG. 1.

We are able to overcome this problem and to use much lower temperatures in baking the envelope 15 of FIG. 1 because (1) we effect the required conversion of the titanium hydride to titanium with a low hydrogen concentration separately and apart from the envelope 15, and (2) we maintain the titanium in this activated condition by sealing it in the evacuated capsule 40, all as explained above. Thus we have no need to rely upon bakeout of the envelope 15 for activating the getter material. Accordingly, even though the envelope 15 is baked-out at a relatively low temperature (e.g., 450 to 500° C.), the getter material 42 is still in a condition to voraciously sorb the hydrogen content of the envelope 15 when the capsule 40 is punctured.

Although our invention is especially suited to the processing of envelopes that are incapable of withstanding the high temperatures needed to activate the getter material, it is to be understood that it can also be used in processing envelopes that can withstand high temperatures. When used in processing this latter class of envelopes, the capsule 40 with its porous partition still serves to effectively confine the granular titanium getter material 42 while affording access to the hydrogen in envelope 15.

In addition, the separate processing of the capsule 40 in the above-described manner provides, during processing of the capsule 40, large openings in the compartment 49 through which the desorbed gases and gaseous decomposition products can be freely vented. These large openings, which are located between the corrugations of the washer 53, effectively bypass the porous partition 48, thus eliminating any need to vent these gases through the relatively high impedance pores of the partition. Venting these gases only through the partition 48 could undesirably prolong the time required for processing.

Although titanium hydride is the preferred getter material for inclusion in capsule 40, other getter materials such as those mentioned in the aforesaid DeSantis patent can also be used. For example, we could use the hydrides of zirconium, cerium, thorium, vanadium or other metals which are reversibly reactive with hydrogen and are highly sorbing of hydrogen at reduced temperatures.

The parts of capsule 40 are made of stainless steel because stainless steel is a material that will not significantly alloy with titanium at high temperatures, thus assuring that substantially pure titanium will be available to react with the hydrogen after the temperature has been raised to the required high levels.

Figure 3:
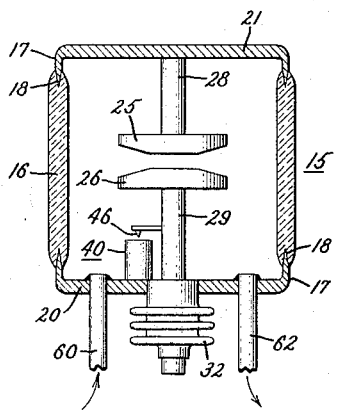
FIG. 3 illustrates a modified emodiment of the invention.

Another method for practicing our invention is illustrated in FIG. 3. The envelope 15 shown in FIG. 3 has been completely sealed except for two tubes 60 and 62 extending through its bottom end plate 20. This envelope 15 of FIG. 3 otherwise generally corresponds to the envelope 15 of FIG. 1 and corresponding reference numerals are therefore used to designate its parts. The envelope in this condition of FIG. 3 is placed in an oven, which may be an air oven; and the oven temperature is raised to a sufficiently high level to release the adsorbed gas and decompose surface contaminants on the interior parts of the interrupter. During this bake-out period, the interior of the envelope 15 is flushed by a stream of dry hydrogen that enters through the tube 60 and exits through the tube 62. The gases evolved by the bake-out mix with the hydrogen and are drawn out of the envelope through the gas stream that leaves through the tube 62.

After a predetermined period of such flushing action, the hydrogen flow through the envelope is terminated and the tubes 60 and 62 are pinched off by a conventional technique that seals the tubes. This leaves a quantity of substantially pure hydrogen entrapped in the sealed envelope 15. The sealed interrupter is then permitted to cool, after which the capsule 40 is punctured by the punch 46 in the same manner as described hereinabove with respect to FIG. 1. This puncturing exposes the titanium getter in the capsule 40 to the hydrogen atmosphere in the envelope 15, and the titanium sorbs or otherwise reacts with the hyddrogen to lower the pressure in the envelope to the desired level.

In still another form of our invention, we bake-out the interrupter as described in connection with FIG. 3, but instead of using a flow of hydrogen to remove the evolved gases, we draw out the evolved gases with an appropriate vacuum pump. Such gases would be removed through a single tube such as 62 in FIG. 3, the other tube being omitted. After a predetermined period, the envelope 15 is sealed by pinching off the tube 62. After a predetermined cooling period, the capsule 40 is punctured, and the getter material therein sorbs any hydrogen that might then or in the future be present in the envelope 15.

While we have shown and described particular embodiments of our invention, it will be obvious to those skilled in the art that various changes and modifications may be made without departing from the invention in its broader aspects; and we, therefore, intend in the appended claims to cover all such changes and modifications as fall within the true spirit and scope of our invention.

What we claim as new and desire to secure by Letters Patent of the United States is:

1. A method of evacuating the envelope of a vacuum device comprising:
   (a) providing a capsule that includes two internal compartments separated by a porous metal partition,
   (b) placing in a first one of said compartments a quantity of getter material in the form of a hydride of a metal that is reversibly reactive with hydrogen and is capable of sorbing a large quantity of hydrogen at low temperatures,
   (c) heating the capsule and the getter material to a sufficiently high temperature to reduce said getter material to said metal and hydrogen and to remove gases and gas-forming contaminants from the surfaces inside said capsule,
   (d) venting the gases evolved by such heating to the exterior of said capsule,
   (e) sealing the interior of said capsule from its exterior,
   (f) placing said sealed capsule within said envelope,
   (g) baking said envelope and removing from the interior of said envelope the gases evolved by said baking,
   (h) sealing said envelope, and
   (i) puncturing an external wall of the second of said compartments in the capsule to afford communication between said getter material and the interior of said envelope via said porous partition.

2. The method of claim 1 in which:
   (a) the interior of said envelope is flushed with hydrogen to remove the gases evolved by said baking,
   (b) said envelope is sealed with hydrogen trapped therein, and
   (c) said getter material sorbs said trapped hydrogen upon puncture of said capsule.

3. The method of claim 1 in which the gases evolved by heating said capsule are vented to the exterior of said capsule at least partially through an opening that communicates directly between said first compartment and the exterior of said capsule.

4. The method of claim 1 in which the gases evolved interiorly of said capsule by heating the capsule are displaced from the capsule by flushing the interior of said capsule with hydrogen during said heating.

5. A method of evacuating a vacuum type circuit interrupter that includes an envelope and a contact movable with respect to said envelope, the steps of:
   (a) providing a capsule that includes two internal compartments separated by a porous metal partition,
   (b) placing in a first one of said compartments a quantity of getter material in the form of a hydride of a metal that is reversibly reactive with hydrogen and is capable of sorbing a large quantity of hydrogen at low temperatures,
   (c) heating the capsule and the getter material to a sufficiently high temperature to reduce said getter material to said metal and hydrogen and to remove gases and gas-forming contaminants from the surfaces inside said capsule,
   (d) venting the gases evolved by such heating to the exterior of said capsule,
   (e) sealing the interior of said capsule from its exterior,
   (f) placing said sealed capsule within said envelope,
   (g) baking said envelope and removing from its interior the gases evolved by said baking,
   (h) sealing said envelope,
   (i) providing inside said envelope and outside said capsule a punch movable in response to motion of said movable contact,
   (j) operating said movable contact through travel that causes said punch to puncture an external wall of the second of said compartments to afford communication between said getter material and the interior of said envelope via said porous partition.

6. The method of claim 5 in which:
   (a) the interior of said envelope is flushed with hydrogen to remove the gases evolved by said baking,
   (b) said envelope is sealed with hydrogen trapped therein; and
   (c) said getter material sorbs said trapped hydrogen upon puncture of said capsule.

7. A vacuum type circuit interrupter comprising:
   (a) a sealed envelope and a contact movable within said envelope,
   (b) an initially sealed capsule containing a getter material,
   (c) a puncturing tool located inside said envelope and outside said capsule,
   (d) and means transmitting contact motion to said puncturing tool for driving said puncturing tool into said sealed capsule when said contact is moved through a predetermined travel, thereby to establish communication between said getter material and the interior of said envelope.

8. The vacuum type circuit interrupter of claim 7 in which:
   (a) said capsule comprises two internal compartments separated by a porous metal partition,
   (b) said getter material is located in one of said compartments, and
   (c) said puncturing tool is arranged to penetrate an external wall of the other of said compartments when operated by said contact motion.

9. A vacuum type electric discharge device comprising:
   (a) an evacuated envelope,
   (b) a granular getter material inside said envelope,
   (c) a container for said getter material,
   (d) a wall portion of said container being made of sintered porous metal material that is substantially nonreactive with said getter material,
   (e) the pores in said porous metal material permitting gases to flow between the interior and exterior of said container but being smaller than the smallest particles of said getter material to prevent escape of said particles from said container,
   (f) said container being substantially imperforate aside from the pores in said porous metal member.

References Cited by the Applicant

UNITED STATES PATENTS 2,859,571  11/1958  Boyd.
2,934,392   4/1960  DeSantis.

RICHARD H. EANES, Jr., *Primary Examiner.*